(12) United States Patent
Torres (10) Patent No.: US 10,718,921 B2
(45) Date of Patent: Jul. 21, 2020

(54) MODULAR OPTICAL FIBER DISTRIBUTION SYSTEM

(71) Applicant: Corning Optical Communications LLC, Hickory, NC (US)

(72) Inventor: Diego David Torres, Hickory, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 64 days.

(21) Appl. No.: 15/602,347

(22) Filed: May 23, 2017

(65) Prior Publication Data

US 2017/0343762 A1 Nov. 30, 2017

Related U.S. Application Data

(60) Provisional application No. 62/341,354, filed on May 25, 2016.

(51) Int. Cl.
| | |
|---|---|
| *G02B 6/28* | (2006.01) |
| *G02B 6/44* | (2006.01) |
| *G02B 6/00* | (2006.01) |
| *G02B 6/46* | (2006.01) |
| *H04B 10/25* | (2013.01) |

(52) U.S. Cl.
CPC ......... *G02B 6/4472* (2013.01); *G02B 6/4475* (2013.01); *G02B 6/46* (2013.01); *H04B 10/25* (2013.01)

(58) Field of Classification Search
CPC ...... G02B 6/4471; G02B 6/46; G02B 6/4446; G02B 6/4454; G02B 6/4472; G02B 6/4475; G02B 6/4401; H04B 10/25

USPC ..... 385/95, 99–102, 106, 109, 112–114, 135
See application file for complete search history.

(56) References Cited

U.S. PATENT DOCUMENTS

| | | | |
|---|---|---|---|
| 3,661,251 A | 5/1972 | Waeltz | |
| 4,615,112 A | 10/1986 | Shannon | |
| 4,965,227 A | 10/1990 | Chang et al. | |
| 6,266,871 B1 | 7/2001 | Edwards | |
| 6,356,458 B1 | 3/2002 | Andreassen | |
| 7,127,143 B2 | 10/2006 | Elkins, II et al. | |
| 9,333,602 B2 | 5/2016 | Otten et al. | |
| 2007/0071392 A1* | 3/2007 | Baucom | G02B 6/4475 385/100 |
| 2010/0092129 A1* | 4/2010 | Conner | G02B 6/4452 385/17 |

(Continued)

*Primary Examiner* — Kaveh C Kianni
*Assistant Examiner* — Hung Q Lam
(74) *Attorney, Agent, or Firm* — William D. Doyle (57) ABSTRACT

A modular optical fiber distribution unit and related distribution system is provided. The distribution unit includes a shifted fiber arrangement that allows for modular network assembly. For example, the distribution unit includes a distribution body including a plurality of body optical fibers and a field optical fiber leg including a plurality of field optical fibers including at least one active field optical fiber and at least one inactive field optical fiber. Each active field tether optical fiber is optically coupled to one of the body optical fibers and at least one body optical fiber is not coupled to an active field optical fiber. The positioning of the active and inactive field tether optical fibers in a predetermined manner disclosed herein allows for modular network assembly.

17 Claims, 5 Drawing Sheets

(56) References Cited

U.S. PATENT DOCUMENTS

| | | | |
|---|---|---|---|
| 2010/0158453 A1* | 6/2010 | Cody | G02B 6/4433 |
| | | | 385/100 |
| 2014/0254986 A1 | 9/2014 | Kmit et al. | |
| 2014/0355941 A1* | 12/2014 | Burris | G02B 6/4415 |
| | | | 385/101 |
| 2015/0160424 A1* | 6/2015 | Frye | G02B 6/4475 |
| | | | 385/100 |
| 2016/0159559 A1 | 6/2016 | Vogrig | |

* cited by examiner

MODULAR OPTICAL FIBER DISTRIBUTION SYSTEM

CROSS-REFERENCE TO RELATED APPLICATIONS

This application claims the benefit of priority under 35 U.S.C. § 119 to U.S. Provisional Application No. 62/341,354, filed on May 25, 2016, and is incorporated herein by reference.

BACKGROUND

The disclosure relates generally to fiber distribution systems and more particularly to an optical fiber distribution system including one or more modular optical fiber unit including an optical fiber arrangement that facilitates the modular system construction.

In conventional optical fiber distribution systems, a lower fiber count branch may be spliced to fiber(s) of the distribution cable at a point along the length of a distribution cable in order to provide network access to users at points along the length of the distribution cable. In this manner, optical network service from the cable is split out to users at various points along the length of the distribution system.

SUMMARY

One embodiment of the disclosure relates to an optical fiber distribution unit. The distribution unit includes a distribution body. The distribution body includes a first distribution optical fiber, a second distribution optical fiber, and a third distribution optical fiber. The first, second and third distribution optical fibers extend between a source end and a field end of the distribution body. The distribution unit includes a first tether including a first tether optical fiber optically coupled to the first distribution optical fiber at either a mid-span position of the first distribution optical fiber or at a field end of the first distribution optical fiber. The distribution unit includes a second tether. The second tether includes a first, second tether optical fiber optically coupled to the second distribution optical fiber, a second, second tether optical fiber optically coupled to the third distribution optical fiber and a third, second tether optical fiber that is not optically coupled to any optical fiber of the distribution body.

Another embodiment of the disclosure relates to a modular optical fiber distribution unit. The distribution unit includes a source-side optical fiber leg including a plurality of source-side leg optical fibers, a distribution body including a plurality of body optical fibers, and a field-side optical fiber leg including a plurality of field-side leg optical fibers including at least one active field-side leg optical fiber and at least one inactive field-side leg optical fiber. Each source-side leg optical fiber is optically coupled to one of the body optical fibers and each body optical fiber is optically coupled to one of the source-side leg optical fibers. Each active field-side leg optical fiber is optically coupled to one of the source-side leg optical fibers and the at least one inactive field-side leg optical fiber is not optically coupled to any of the source-side leg optical fibers.

Another embodiment of the disclosure relates to a connectorized optical cable assembly for an optical fiber distribution system. The cable assembly includes a distribution cable including at least six distribution cable optical fibers extending between a first end and a second end of the distribution cable. The cable assembly includes a source-side tether. The source-side tether includes at least six source-side tether optical fibers and an optical connector coupled to a source end of each of the at least six source-side tether optical fibers. The cable assembly includes a source-side splice location at which a field end each of the at least six source-side tether optical fibers is spliced to one of the at least six distribution cable optical fibers. The cable assembly includes a midpoint branch tether including a branch tether optical fiber spliced at a mid-point location to one of the at least six distribution cable optical fibers. The cable assembly includes a field-side tether. The field-side tether includes at least six field-side tether optical fibers and an optical connector coupled to a field end of each of the at least six field-side tether optical fibers. The cable assembly includes a field-side splice location at which each of at least five of the field-side tether optical fibers are spliced to one of the distribution cable optical fibers and at least one of the field-side tether optical fibers is not spliced to any of the distribution cable optical fibers.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical fiber distribution system are shown. The optical fiber distribution system discussed herein is formed from a plurality of individual, modular distribution units that are configured for ease of assembly and versatility in the construction of the optical fiber distribution system from the modular units.

In particular embodiments, each modular distribution unit is a distribution cable assembly that includes a distribution cable that supports a plurality of cable optical fibers. Each modular distribution unit includes a source tether including a plurality of source tether optical fibers, and a field tether including a plurality of field tether optical fibers. In the embodiments discussed herein, in order to avoid the need to construct specialized or dedicated source and field tethers, the main cable section, the source tether and the field tether all of have the same, plural number of optical fibers that are spliced together in a predetermined arrangement (e.g., a shifted fiber arrangement) which allows multiple modular distribution units to be coupled together via optical connectors to construct an optical fiber distribution network from the modular units discussed herein.

At the source side, the optical fibers of the source tether are each spliced to one of the cable optical fibers. At a position along the length of the main cable section, the optical fiber unit includes at least one branch tether that includes at least one optical fiber that is optically coupled (e.g., via a splice) to a first optical fiber of the cable at an access point (e.g., a mid-span access point) which allows the optical network to be branched off of the distribution cable. Because one of the cable optical fibers was split to service the branch tether, the field side of the cable includes one less active optical fiber than the source side.

In this arrangement, the remaining active cable optical fibers are each optically coupled with one of the field tether optical fibers which leaves one of the field tether optical fibers inactive and unspliced to an optical fiber of the distribution cable. As discussed herein, the field optical fiber tether is spliced to the cable optical fibers in a predetermined order which allows the inactive fiber at the field end (i.e., the fiber which has been routed to service the branch) to occupy a known, predetermined position (e.g., the last fiber position in the field tether, the twelfth position in a twelve fiber field tether) such that subsequent identical optical fiber network units can be assembled together while ensuring that the inactive cable fiber is not inadvertently connected back into the network. In addition, to facilitate simple network assembly, the source and field tethers are pre-connectorized facilitating assembly of multiple optical network units to form the optical distribution network without the need for on-site splicing.

In contrast to some modular network arrangements which use indexed terminals to manage fiber position and fiber branching, the modular optical distribution system discussed herein eliminates one set of optical connector couplings (and the signal loss associated with each connector coupling) for each unit of the network. Further, in typical indexed terminal network arrangements, the branching service from the main optical cable occurs at the indexed terminal. In contrast, the arrangement discussed herein uses the mid-span optical branch tether which may be spliced to the distribution cable at any mid-span position as needed from a particular network, which provides additional flexibility in network deployment.

Figure 1:
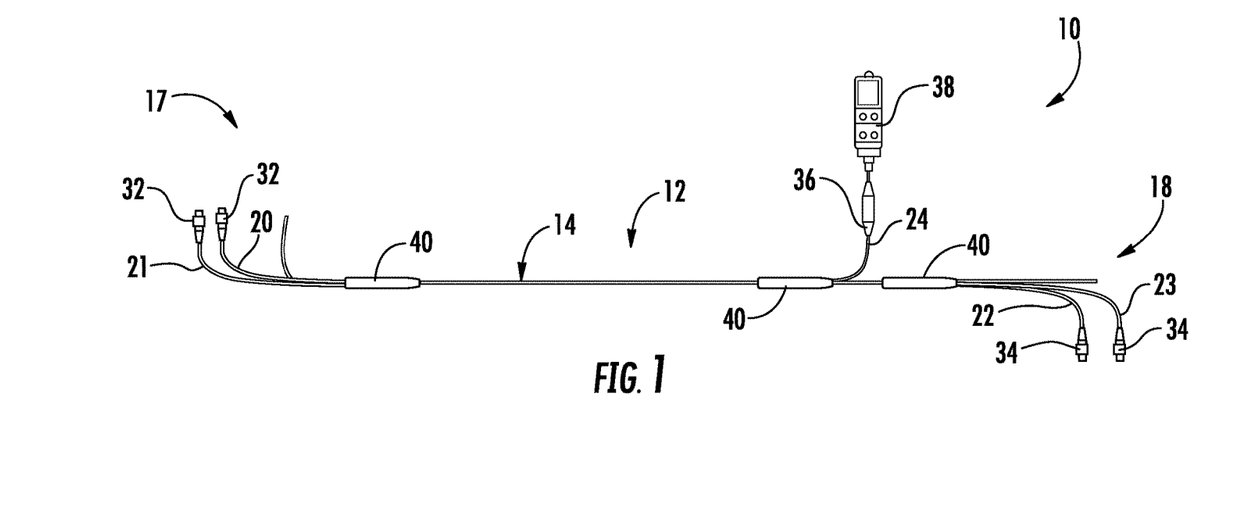
FIG. 1 shows a schematic side view of a modular optical fiber distribution unit according to an exemplary embodiment.
Figure 2:
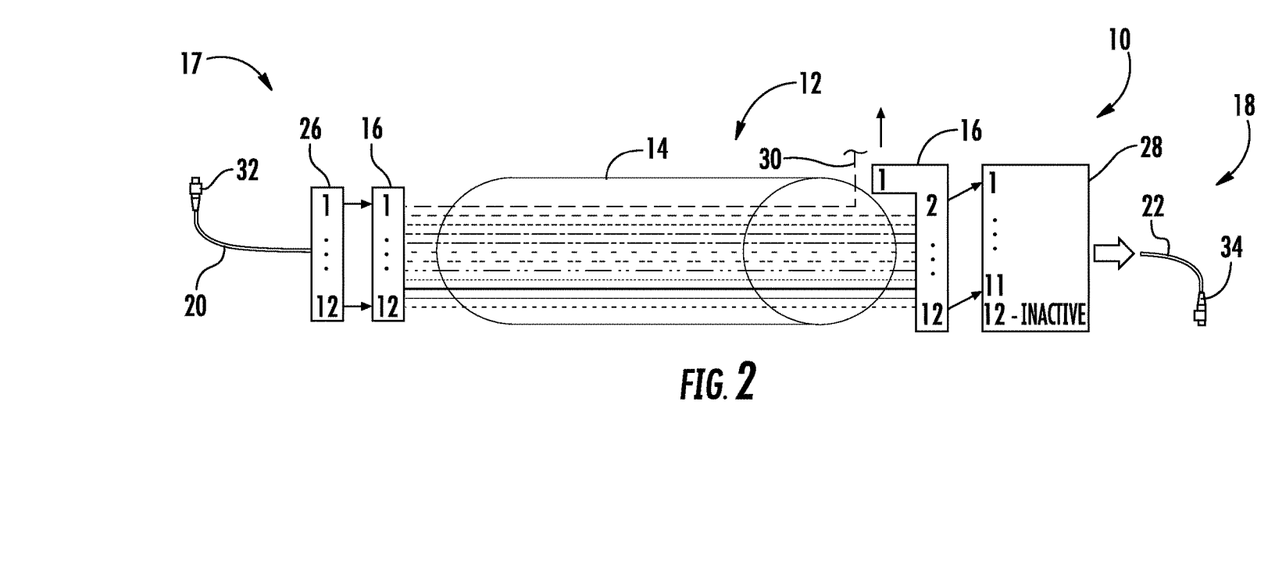
FIG. 2 is a schematic view showing fiber splicing within the modular optical fiber distribution unit of FIG. 1, according to an exemplary embodiment.
Figure 3:
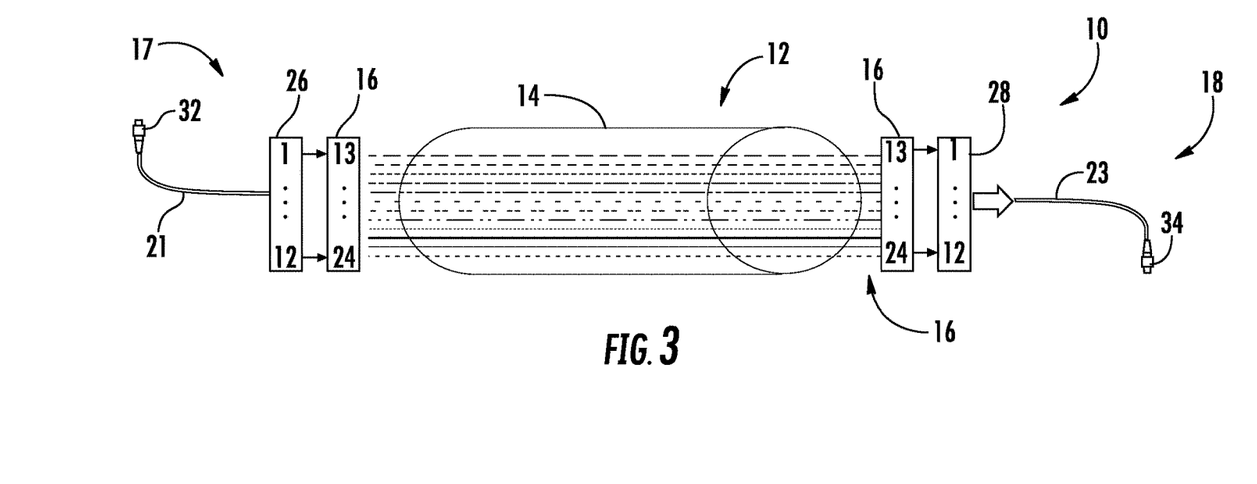
FIG. 3 is a schematic view showing fiber splicing within the modular optical fiber distribution unit of FIG. 1, according to an exemplary embodiment.

Referring to FIGS. 1-3, a modular optical fiber distribution system unit, such as distribution cable assembly 10, is shown according to an exemplary embodiment. In general, distribution cable assembly 10 includes a distribution cable, such as cable 12. Cable 12 includes an outer jacket 14 which generally extends the length of cable 12 between first, central office or source end 17 and second, user or field end 18 of the cable 12. Outer jacket 14 surrounds a plurality of distribution cable optical fibers, shown schematically as fibers 16, in FIGS. 2 and 3. As will be understood, jacket 14 generally is formed from one or more layer of polymer material (e.g., medium density polyethylene) that provides protection to fibers 16. Cable 12 includes a large number of optical fibers 16 (e.g., at least 6 fibers, at least 12 fibers, at least 24 fibers, at least 48 fibers, etc.) and is designed to distribute optical communication services from a central point in the network to a relatively large number of end users (e.g., network devices, cable boxes splitting out network service to a home, office, etc.).

Distribution cable assembly 10 includes at least one source-side optical fiber leg, shown as source tethers 20 and 21, located at source end 17, and at least one field-side optical fiber leg, shown as field tethers 22 and 23, located at field end 18. Distribution cable assembly 10 also includes at least one branching optical fiber leg, shown as branch tether 24, located at a mid-span position located between source end 17 and field end 18 along the length of cable 12.

As shown in FIGS. 2 and 3, source tethers 20 and 21 each include a plurality of optical fibers 26, shown schematically with the fiber position numbers 1-12. Field tethers 22 and 23 include a plurality of optical fibers 28, shown schematically with the fiber position numbers 1-12. Branch tether 24 includes at least one optical fiber 30, and in a specific embodiment, branch tether 24 includes a single optical fiber 30, as shown in FIG. 2.

Referring to FIG. 1 and FIG. 2, each tether 20, 21, 22, 23 and 24 is pre-terminated and pre-connectorized allowing for easier onsite deployment of network communication services via optical fiber distribution cable assembly 10. Specifically, source tethers 20 and 21 each include an optical connector 32 coupled to the source ends of source tether optical fibers 26. Field tethers 22 and 23 each include an optical connector 34 coupled to the field ends of field tether optical fibers 28. Branch tether 24 includes an optical connector 36 coupled to the field end of branch optical fiber 30. In general, optical connectors 32, 34 and 36 allow for plug and play connection with a variety of network units or devices. For example, as shown in FIG. 1, optical connector 36 couples branch tether 24 to a splitter terminal 38 (e.g., a 1×4 splitter terminal, 1×8 splitter terminal, etc.) which splits the optical network carried by branch tether 24 to further field users or network devices, and as will be explained in more detail below regarding FIG. 4, optical connectors 32 and 34 facilitate assembly of multiple distribution cable assemblies 10 together to construct a multi-branched optical network. The optical connections made between connectors 32, 34 and 36 are made via the connectors without the need for on-site splicing of optical fibers.

In general, optical connectors 32, 34 and 36 may be any suitable optical connector. In various embodiments, optical connectors 32, 34 and 36 are optical connectors configured for use in an outdoor or indoor environment. In various embodiments, optical connectors 32, 34 and 36 are any suitable optical connector, such as but not limited to SC, LC, DC, FC, ST, SC/DC, MT-RJ, MTP, MPO and other like single or multi-fiber ferrules now known or hereafter developed. In particular embodiments, tethers 20, 21, 22 and 23 are OptiTIP® tethers and tether 24 is an OptiTAP® tether, available from Corning, Inc.

The optical fibers of tethers 20, 21, 22, 23 and 24 are coupled to one of the cable optical fibers 16 in order to allow optical signals to propagate through the network as desired. As shown in FIG. 1, each of the splice points between the fibers of cable 12 and the fibers of tethers 20, 21, 22, 23 and 24 is protected by an over-molded cover or shell 40 that surrounds the associated splice point. As shown in FIG. 1, source tethers 20 and 21 (and consequently source tether fibers 26) extend out of and away from its associated cover 40 toward the source end 17 of cable 12. Field tethers 22 and 23 (and consequently field tether fibers 28) extend out of and away from its associated cover 40 toward the field end 18 of cable 12. Branch tether 24 (and consequently branch tether fiber 30) extends out of and away from its associated cover 40 generally toward field end 18 of cable 12. In general, covers 40 protects and supports tethers 20, 21, 22, 23 and 24 and provide barriers or seals around the opening in cable jacket 14 that is formed to allow access to and splicing between cable fibers and tether fibers. In various embodiments, the optical connections between the optical fibers of tethers 20, 21, 22, 23 and 24 and cable fibers 16 and the configuration of covers 40 may be those as shown in U.S. Pat. No. 7,127,143 which is incorporated herein by reference in its entirety.

Distribution cable assembly 10 typically includes one or more access areas at which branch tether 24 is spliced onto a cable optical fiber along the length of distribution cable 12. The branch tether access areas are located between the source end 17 and field end 18 of cable 12 and are generally referred to as mid-span access areas. In general, at the branch access areas, a branch tether 24 is spliced to cable optical fibers 16, such that a portion of the optical network can be split out at a mid-point along the length of the distribution cable. In this arrangement, the optical network is delivered at the branch point by branch tether 24 which generally extends away from cable 12 toward a field user, device, home, office, etc. In some embodiments, tether 24 may be coupled to a drop cable (such as a single fiber drop cable) which in turn is coupled to splitter terminal 38 which allows the splitter terminal 38 to be positioned at a further distance away from cable 12 than the length of tether 24 by itself would allow.

In the embodiment shown, each branching access area includes a single branching tether 24 that includes a single optical fiber 30 spliced to a single cable optical fiber 16. However, in other embodiments, each distribution cable assembly 10 may include multiple branching mid-span access points along the length of cable 12, and each branching access point may include more than one branching tether 24 and/or more than one branching optical fiber 30.

Referring to FIGS. 2 and 3, the splicing between optical fibers of the various components of cable assembly 10 and the fiber shifting at the field end of cable assembly 10 are shown in detail. Referring to FIG. 2, each fiber 26 of source tether 20 is spliced to one of the cable optical fibers 16. As shown in FIG. 2, source tether fibers 26 have a position, shown schematically with the position number 1-12, and each source tether fiber 26 is spliced to the cable optical fiber 16 having the corresponding position number. For example, source tether fiber 26 at position 1 is spliced to cable optical fiber 16 at position 1, source tether fiber 26 at position 2 is spliced to cable optical fiber 16 at position 2, and so on, such that each of the cable optical fibers 16 are allowed to receive optical signals propagated through one of the fibers of source tether 20 (e.g., each of the cable optical fibers 16 are optically coupled to one of the fibers of source tether 20).

At the mid-span access area, at least one of the cable optical fibers 16, such as cable optical fiber 16 at position 1, is spliced to branch optical fiber 30. This connection between fiber 30 and the position 1 cable optical fiber 16 allows the optical signals carried through the position 1 source tether optical fiber 26 to be carried through the position 1 cable optical fiber 16 into branch tether 30 and eventually to the user(s) and/or device(s) served by branch tether 24.

As will be understood, splicing of branch tether 30 to the position 1 cable optical fiber 16 renders the portion of the position 1 cable optical fiber 16 field from the branch point (i.e., the area between branch tether 30 splice point and field end 18) inactive. Thus, distribution cable assembly 10 includes a predetermined or fiber shifted splicing arrangement between cable optical fibers 16 and fibers 28 of field tether 22 that allows multiple cable assemblies 10 to be coupled together while ensuring that all of the cable optical fibers 16 (except the one spliced to tether 24) are coupled to a predetermined set or group of fibers 28 of field tether 22.

As shown in FIG. 2, the predetermined or fiber shifted splicing arrangement results in position 2 cable optical fiber 16 being spliced to position 1 fiber 28 of field tether 22, position 3 cable optical fiber 16 being spliced to position 2 fiber 28 of field tether 22, and so on until position 12 cable optical fiber 16 is spliced to position 11 fiber 28 of field tether 22. This arrangement leaves the position 12 fiber 28 of field tether 22 not optically connected to any of cable fibers 16, which results in the position 12 fiber 28 of field tether 22 being inactive (e.g., not coupled to receive optical signals from fibers source within the distribution network). Further, in this arrangement, at least one cable optical fiber 16 is not optically coupled at its field end to any of the fibers 28 of field tether 22. In particular, at least one cable optical fiber 16 is not spliced at its field end to any of the fibers 28 of field tether 22. As will be discussed in detail regarding FIG. 4, this predetermined positioning or predetermined shifting of the active and inactive fibers at field tether 22 allows multiple cable assemblies 10 to be connected together to form a modularly constructed network without the need for fiber positions to be tracked at the time of network assembly providing a plug-and-play assembled fiber optic network.

Referring to FIG. 3, the splicing of the fibers of source optical tether 21 and field optical tether 23 to optical cable fibers 16 is shown. Source tether fibers 26 of second source tether 21 also have a position shown schematically with the position number 1-12. As shown in FIG. 3, the position 1 fiber 26 of second source tether 21 is spliced to the position 13 cable optical fiber 16, the position 2 source tether fiber 26 is spliced to the position 14 cable optical fiber 16, and so on, such that each of the cable optical fibers 16 at positions 13-24 is optically coupled (e.g. coupled to receive optical signals) through one of the fibers of source tether 21. The arrangement shown in FIG. 3 may be repeated with additional groups of fibers (e.g., groups of 12 fibers) in arrangements having 36 fibers, 48 fibers, etc.

Similarly, field tether fibers 28 of second field tether 23 have a position shown schematically with the position number 1-12. As shown in FIG. 3, position 1 fiber 28 of second field tether 23 is spliced to position 13 cable optical fiber 16, position 2 fiber 28 of second field tether 23 is spliced to position 14 cable optical fiber 16 and so on, such that each of the cable optical fibers 16 at positions 13-24 are optically coupled to optical fibers of field tether 23 at positions 1-12. As will be explained in more detail below regarding FIG. 4, this arrangement allows signals on fibers 13-24 to be passed field for branching at later segments in the network.

Figure 4:
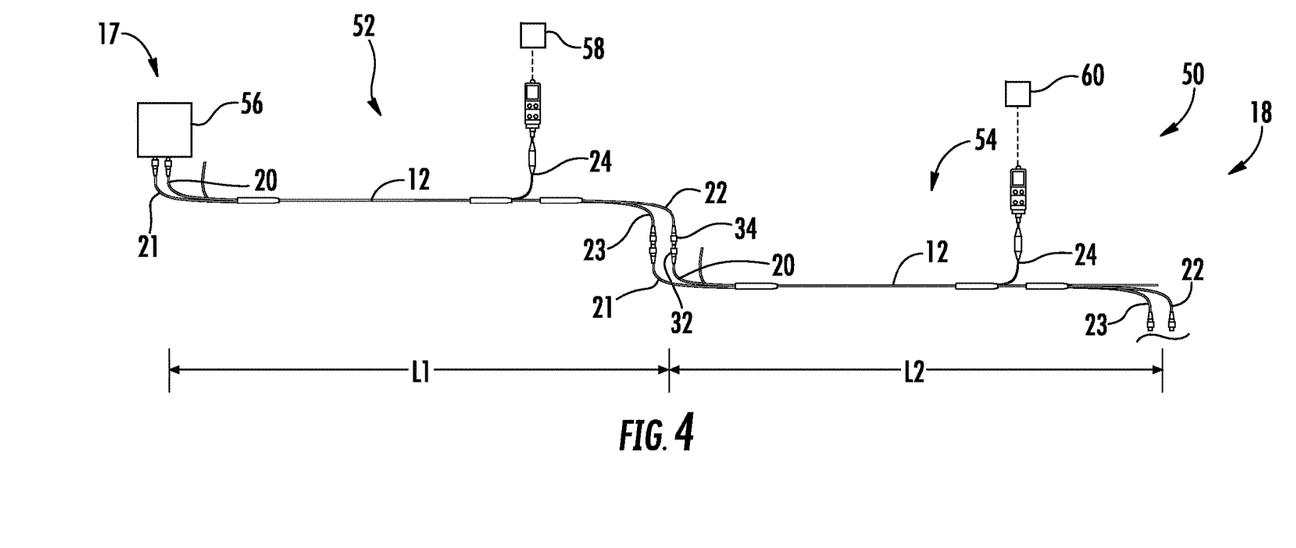
FIG. 4 shows a schematic view of a portion of an optical fiber distribution system according to an exemplary embodiment.

Referring to FIG. 4, a modular optical fiber network or system 50 constructed from multiple distribution cable assemblies 10, shown as first distribution unit 52 and second distribution unit 54, is shown. In addition, FIG. 4 illustrates how the splicing arrangements shown in FIGS. 2 and 3 allow for modular network construction without the need to track fiber position during network construction. In general, distribution units 52 and 54 are the same as distribution cable assembly 10 discussed above and are assembled to form modular system 50.

In system 50, all optical fibers of source tethers 20 and 21 of first distribution unit 52 are optically coupled to receive optical signals from a source-side portion of the network, shown schematically as central office or signal source 56. Referring to first distribution unit 52, the first branch tether 24 is spliced to position 1 cable optical fiber 16, which in turn delivers the optical signals carried on position 1 cable optical fiber 16 through tether 24 to end user 58. At the splice point between cable optical fibers 16 and fibers of field tether 22, the fibers are position shifted as shown in FIG. 2, such that position 2 cable optical fiber 16 is spliced to position 1 fiber 28 of field tether 22, position 3 cable optical fiber 16 is spliced to position 2 fiber 28 of field tether 22, and so on until position 12 cable optical fiber 16 is spliced to position 11 fiber 28 of field tether 22.

To expand the network beyond a single branch point, second distribution unit 54 is connected to first distribution unit 52. In this arrangement, the optical connector 34 of field tether 22 of first distribution unit 52 is connected to optical connector 32 of source tether 20 of second distribution unit 54. Thus, referring to first distribution unit 52, cable optical fibers 16 at positions 2-12 are connected to positions 1-11 of optical fibers 28 of field tether 22, and through the connection between first distribution unit 52 and second distribution unit 54, positions 1-11 of optical fibers 28 of field tether 22 are coupled to positions 1-11 of optical fibers 26 of source tether 20 of second distribution unit 54. In this arrangement, the first branch tether 24 of second distribution unit 54 is spliced to the position 1 cable optical fiber 16 of second distribution unit 54. Because of the fiber shifting arrangement, optical signals carried within position 2 cable optical fiber 16 of first distribution unit 52 are carried into the position 1 cable optical fiber 16 of second distribution unit 54 (via the shifting at the first field tether 22), and then through tether 24 of second distribution unit 54 to second end user 60.

In addition, optical connector 34 of field tether 23 of first distribution unit 52 is connected to optical connector 32 of source tether 21 of second distribution unit 54. In this manner, cable optical fibers 16 at positions 13-24 of first distribution unit 52 are routed to cable optical fibers 16 at positions 13-24 of second distribution unit 54.

Thus, by cascading the modular distributions units discussed herein, active optical fibers of the source distribution unit are routed or shifted to a predetermined group of optical fibers of the adjacent field unit which includes the fiber leading to the branch tether. This pattern can be repeated until all of the active fibers are distributed to a branch tether of the adjacent field unit. Once the network includes 12 cascaded distribution cable assemblies 10, all of the first 12 positions of cable optical fibers 16 will have been routed to branch tethers 24 and to users. To ensure additional cascading beyond the first 12 units, field tether 23 of the 12th distribution unit will be coupled to source tether 20 of the 13th distribution unit such that the remaining active fiber positions 13-24 are routed to fiber positions 1-12 in the 13th distribution unit. This allows further cascading of distribution units to branch out the network associated with original fiber positions 13-24.

Further referring to FIG. 4, in general, each distribution unit within network 50 have the same configuration and fiber positioning as all other distribution units within the network, and the fiber shifting discussed herein allows the network to be assembled onsite without tracking which fibers have been spliced to branching points at various points along the network. However, in various embodiments, distribution units may be formed with a variety of variations which allow customization in the network assembly formed from the modular distribution units.

For example as shown in FIG. 4, first distribution unit 52 has a length, L1, and second distribution unit 54 has a length, L2. In various embodiments, L1 and L2 can be different from each other which allows for customization of the location of branch tethers 24 along the network 50. In other embodiments, other aspects of various distribution units may be different from each other, while maintaining the fiber positioning, shifting and modularity discussed herein. For example, in some embodiments, lengths of branch tethers 24 of different distribution units may be different from each other. As another example, in some embodiments, the positioning along the length of cable 12 of branch tethers 24 of different distribution units may be different from each other.

It should be understood that while the exemplary embodiments discussed above are described in the context of a system that distributes 24 optical fibers utilizing 12 fiber source and field tethers, the fiber shifted modular system discussed herein can be utilized with a variety of different numbers of optical fibers. For example, in various embodiments, cable 12 of each distribution cable assembly 10 can include 3, 4, 6, 8, 10, 12, 18, 32, 36, 48, etc. optical fibers. In general, the source and field tethers have the same number or fewer optical fibers than the associated cable 12, and the source and field tethers can include 2, 3, 4, 6, 8, 10, 12, 18, 32, 36, 48, etc. optical fibers.

Figure 5:
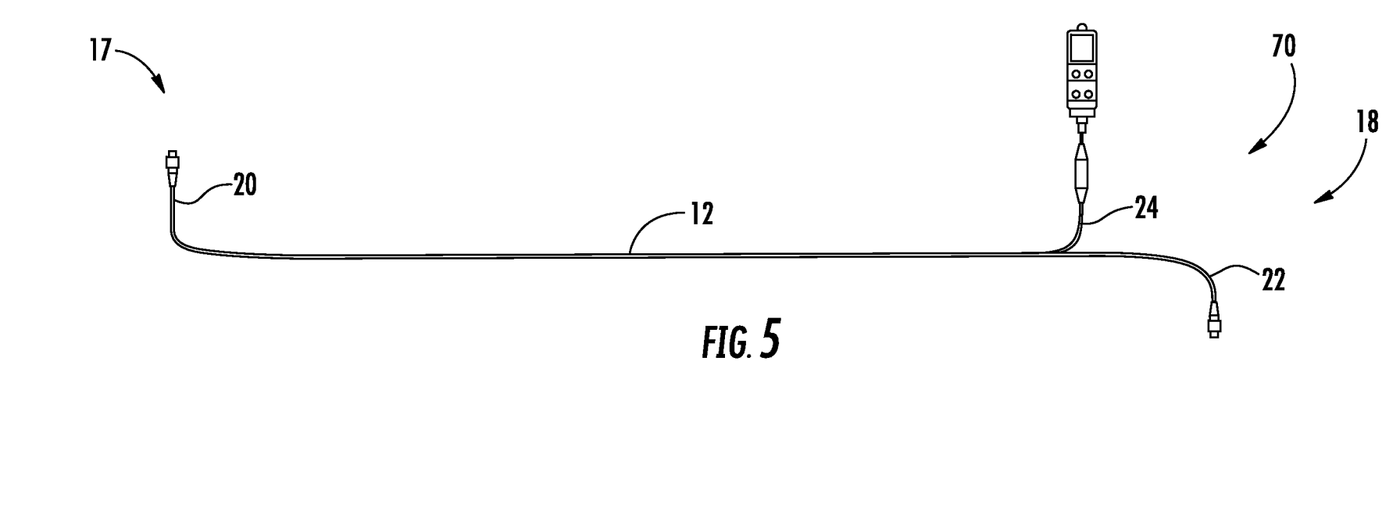
FIG. 5 shows a schematic side view of a modular optical fiber distribution unit according to another exemplary embodiment.
Figure 6:
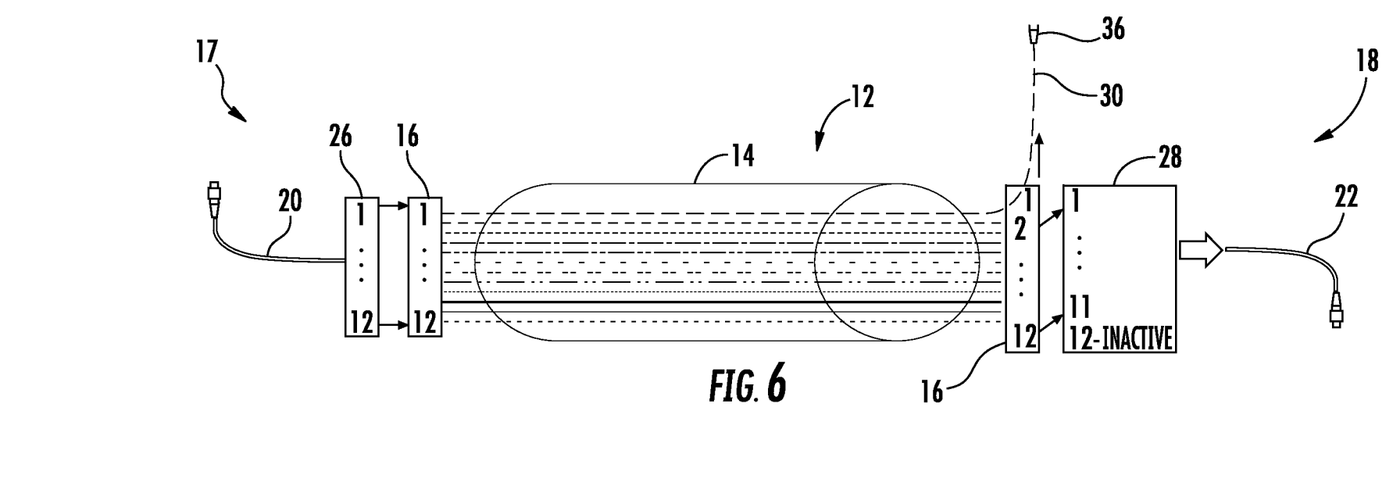
FIG. 6 is a schematic view showing fiber splicing within the modular optical fiber distribution unit of FIG. 5, according to an exemplary embodiment.

As a specific example, referring to FIG. 5 and FIG. 6, a modular optical fiber distribution system unit, such as distribution cable assembly 70, is shown according to an exemplary embodiment. Distribution cable assembly 70 is substantially the same as distribution cable assembly 10 except as discussed herein. In general, distribution cable assembly 70 includes a single source tether 20 and a single field tether 22, and in such embodiments, each tether 20 and 22 includes the same number of optical fibers as cable 12, but includes the same fiber shifting between cable fibers 16 and fibers 28 of field tether 22.

Figure 7:
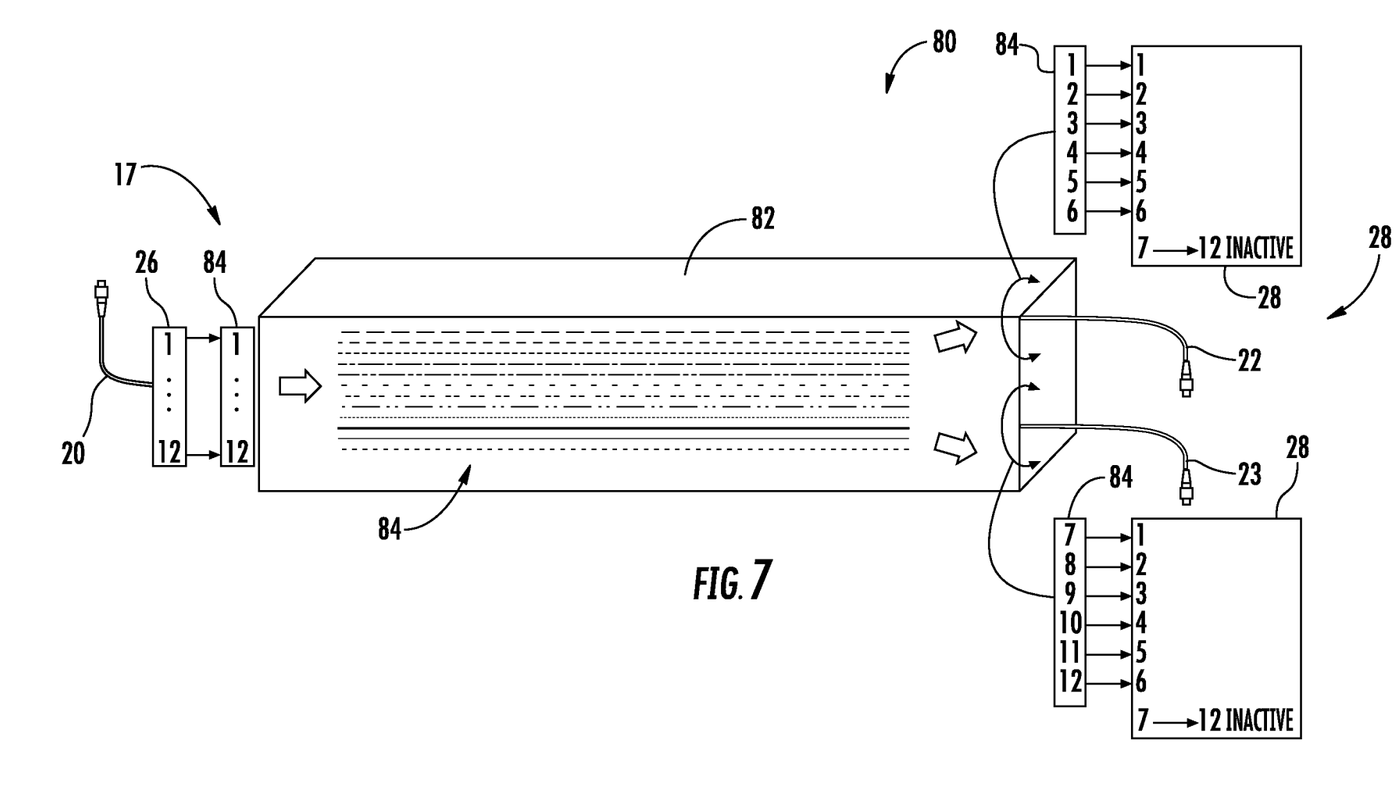
FIG. 7 shows a schematic side view of a modular optical fiber distribution unit according to another exemplary embodiment.

Referring to FIG. 7, a modular optical fiber distribution system unit, such as distribution splitter assembly 80, is shown according to an exemplary embodiment. In general rather than splitting a single active fiber at each unit (as with branch tether 24 discussed above), splitter assembly 80 utilizes the fiber mapping or shifting innovations discussed herein to split fibers into groups that can then be further distributed utilizing cable distribution assemblies 10 or other fiber optic cable arrangements.

Splitter assembly 80 includes a distribution body, shown as housing 82, which is generally formed from a rigid material (e.g., metal, plastic, etc.) that supports a plurality of optical fibers 84. Splitter assembly 80 includes at least one source tether 20 located at source end 17, and at least one field, shown as field tethers 22 and 23, located at field end 18.

Similar to distribution cable assembly 10, each fiber 26 of source tether 20 is spliced to one of the body optical fibers 84. As shown in FIG. 7, source tether fibers 26 have a position shown schematically with the position number 1-12, and each source tether fiber is spliced to the body optical fiber 84 having the corresponding position number. For example, source tether fiber 26 at position 1 is spliced to body optical fiber 84 at position 1, source tether fiber 26 at position 2 is spliced to body optical fiber 84 at position 2, and so on, such that each of the body optical fibers 84 are optically coupled to receive optical signals propagated through source tether 20.

As shown in FIG. 7, the predetermined or fiber shifted splicing arrangement of splitter 70 directs the positions 1-6 of body optical fiber 84 to be spliced to positions 1-6 of fibers 28 of field tether 22, respectively. This arrangement leaves the positions 7-12 of fibers 28 of field tether 22 not optically connected to any of body optical fibers 84, which results in the positions 7-12 of fibers 28 of field tether 22 inactive (e.g., not coupled to receive optical signals from fibers source within the distribution network). Further, in this arrangement, six of the body optical fibers 84 (e.g., positions 7-12 of body optical fiber 84) are not coupled at its field end to any of the fibers 28 of field tether 22.

Similarly, the predetermined, mapped or fiber shifted splicing arrangement of splitter 70 directs the positions 7-12 of body optical fiber 84 to be spliced to positions 1-6 of fibers 28 of second field tether 23, respectively. This arrangement leaves the position 7-12 of fibers 28 of field tether 23 not optically connected to any of body optical fibers 84, which results in the positions 7-12 of fibers 28 of field tether 22 inactive (e.g., not coupled to receive optical signals from fibers source within the distribution network). Further in this arrangement, six of the body optical fibers 84 (e.g., positions 1-6 of body optical fiber 84) are not coupled at its field end to any of the fibers 28 of field tether 23. This fiber shifting arrangement allows cable distribution assemblies 10, for example, to be connected to each of field tethers 22 and 23 which in turn allows the predetermined active fibers within tethers 22 and 23 to be routed to the desired active fiber positions and to branch tether 24 within field distribution assemblies. It should be noted that the mapping between fibers 84 and the fibers of tethers 22 and 23 may be ordered in any predetermined manner as desired, e.g., position 3 fiber 84 may be mapped to position 9 fiber 28, position 4 fiber 84 may be mapped to position 8 fiber 28, etc. as long as the mapping is known such that subsequent units are spliced into the network in the proper order.

Figure 8:
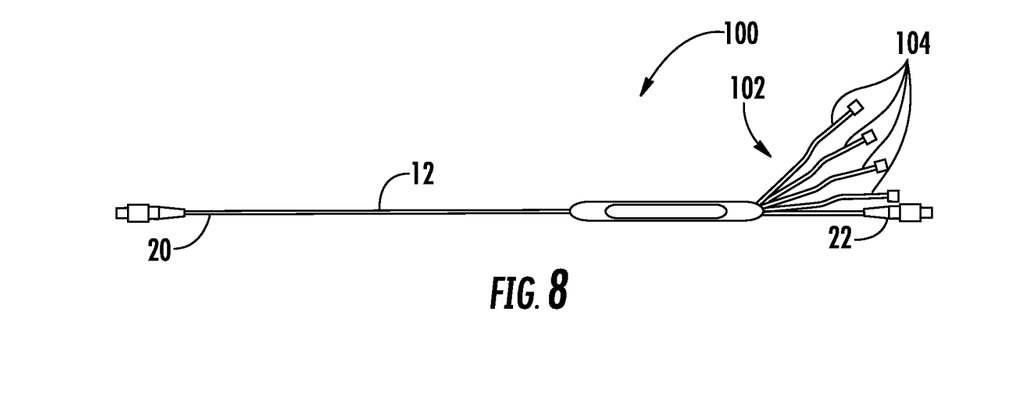
FIG. 8 shows a schematic side view of a modular optical fiber distribution unit according to another exemplary embodiment.
Figure 9:
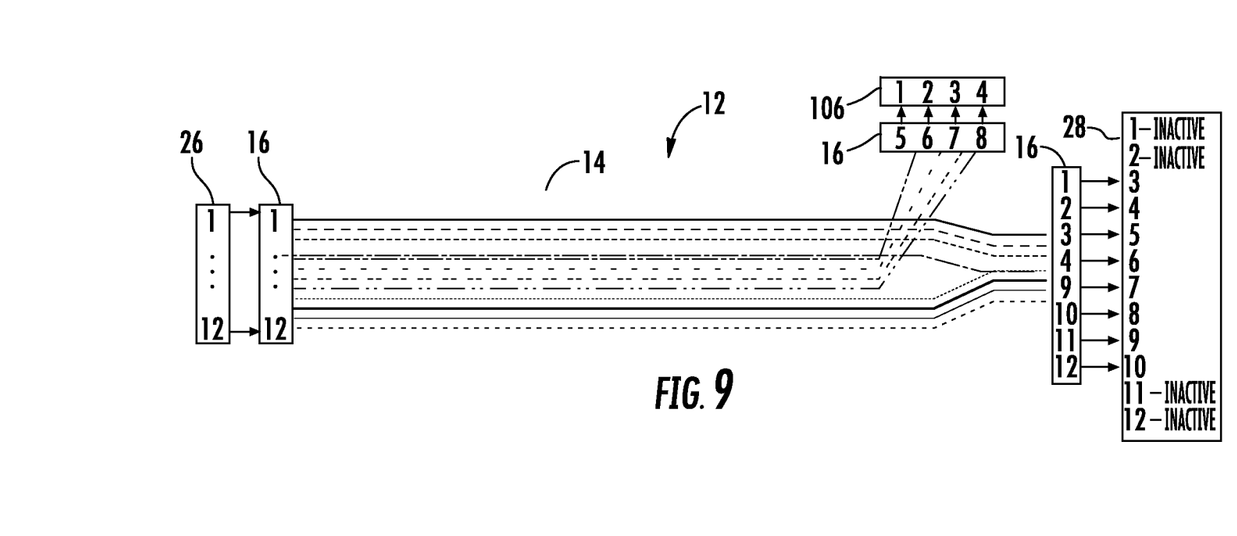
FIG. 9 is a schematic view showing fiber splicing within the modular optical fiber distribution unit of FIG. 8, according to an exemplary embodiment.

Referring to FIG. 8 and FIG. 9, a modular optical fiber distribution system unit, such as distribution cable assembly 100, is shown according to an exemplary embodiment. Distribution cable assembly 100 is substantially the same as distribution cable assembly 10 except as discussed herein. In general, distribution cable assembly 100 includes one or more source tether 20 and one or more field tether 22, and in such embodiments, each tether 20 and 22 includes the same number of optical fibers as cable 12, but includes a different pattern of fiber shifting between cable fibers 16, the branching tether and field tether 22 than that found in the various embodiments discussed above.

Distribution cable assembly 100 includes an optical fiber branch, shown as branch 102. In general, branch 102 includes a least two optical fibers, and in the specific embodiment shown, branch 102 includes four separate single optical fiber tethers 104. Each branching tether 104 includes an optical fiber 106 (shown in FIG. 9).

As shown in FIG. 9, the fiber shifting within distribution cable assembly 100 is arranged such that a central group of cable optical fibers 16 are split out and spliced to one of the optical fibers 106 of tether 104. In the specific embodiment shown, cable optical fibers 16 at positions 5-8 (e.g., the central fibers of a 12 fiber cable 12) are spliced to branch fibers 1-4, respectively. Thus in this manner, the optical signals carried through the position 5-8 source tether optical fibers 26 are carried through the positions 5-8 cable optical fibers 16 into position 1-4 branch tether optical fibers 106, respectively and eventually to the user(s) and/or device(s) served by branch optical fibers 106.

As shown in FIG. 9, distribution cable assembly 100 includes a fiber shifting arrangement at the field end of cable 12 which collapses the live or active cable optical fibers 16 toward the center positions in field side tether 22. In general, this arrangement results in the lowermost and uppermost positions of field tether fibers 28 being inactive and not spliced to any of the cable fibers 16, and the central group of field tether fibers 28 is spliced to a centrally shifted group of cable fibers 16. For example, if branch 102 includes 2 or more branch optical fibers 106, at least the first and last field tether fibers 28 will be inactive through fiber shifting as discussed herein.

In the specific embodiment shown in FIG. 9, cable fiber 16 positions 1-4 are spliced to field tether optical fibers 28 positions 3-6, respectively, and cable fiber 16 positions 9-12 are spliced to field tether optical fibers 28 positions 7-10, respectively. This arrangement leaves the outermost positions (e.g., positions 1, 2, 11 and 12) of field tether optical fibers 28 inactive and unspliced to any of the cable fibers 16. Thus, similar to the other shifting arrangements discussed herein, cable assembly 100 shifts active cable fibers at the field end of cable 12 toward the positions that will service the branching fibers in subsequent network units.

As will be understood, the optical fibers of the cables discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber distribution unit, the distribution unit comprising:
a distribution body comprising:
a first distribution optical fiber;
a second distribution optical fiber; and
a third distribution optical fiber;
wherein the first, second and third distribution optical fibers extend between a source end and a field end of the distribution body;
a first tether including a first tether optical fiber spliced to the first distribution optical fiber at either a mid-span position of the first distribution optical fiber; and
a second tether comprising:
a first, second tether optical fiber optically coupled to the second distribution optical fiber at the field end of the distribution body;
a second, second tether optical fiber optically coupled to the third distribution optical fiber at the field end of the distribution body; and
a third, second tether optical fiber that is not optically coupled to any optical fiber of the distribution body.

2. The distribution unit of claim 1, wherein the distribution body is a distribution cable including an elongate cable jacket surrounding the first, second and third distribution optical fibers.

3. The distribution unit of claim 2, wherein the first tether is a single fiber branch tether optically coupled to the first distribution optical fiber at the mid-span position located between the source and field ends of the distribution cable.

4. The distribution unit of claim 3, further comprising a splitter terminal optically coupled to field ends of the single optical fiber of the branch tether.

5. The distribution unit of claim 4, wherein the distribution cable includes at least twelve distribution optical fibers, the first tether includes only one first tether optical fiber and the second tether includes at least twelve second tether optical fibers.

6. The distribution unit of claim 1, further comprising a third optical tether, the third optical tether comprising:
a first, third tether optical fiber optically coupled to the first distribution optical fiber;
a second, third tether optical fiber optically coupled to the second distribution optical fiber;
a third, third tether optical fiber optically coupled to the third distribution optical fiber;
wherein the first, second and third, third tether optical fibers are located at the source ends of the first, second and third distribution optical fibers.

7. The distribution unit of claim 6, wherein the first and second, second tether optical fibers are spliced to field sections of the first and second distribution optical fibers.

8. The distribution unit of claim 7, further comprising:
a first optical connector coupled to source ends of the first, second and third, third tether optical fibers;
a second optical connector coupled to a field end of the first tether optical fiber; and
a third optical connector coupled to field ends of the first, second and third, second tether optical fibers.

9. A modular optical fiber distribution unit, the distribution unit comprising:
a source-side optical fiber leg including a plurality of source-side leg optical fibers;
a distribution body including a plurality of body optical fibers;
a field-side optical fiber leg including a plurality of field-side leg optical fibers including at least one active field-side leg optical fiber and at least one inactive field-side leg optical fiber; and
a branch optical fiber leg including a single branch optical fiber;
wherein each source-side leg optical fiber is optically coupled to one of the body optical fibers and each body optical fiber is optically coupled to one of the source-side leg optical fibers;
wherein each active field-side leg optical fiber is optically coupled to one of the source-side leg optical fibers and the at least one inactive field-side leg optical fiber is not optically coupled to any of the source-side leg optical fibers; and
wherein the single branch optical fiber is spliced to a first of the plurality of body optical fibers at a mid-span position between the source-side fiber leg and the field-side optical fiber leg, wherein the first body optical fiber is not optically coupled to an active field-side leg optical fiber.

10. The distribution unit of claim 9, wherein the distribution body is a distribution cable extending between the source-side and field-side optical fiber legs such that the source-side and field-side optical fiber legs are located at opposing ends of the distribution cable from each other.

11. The distribution unit of claim 9, further comprising:
a first optical connector coupled to the plurality of source-side leg optical fibers;
a second optical connector coupled to the active field-side leg optical fibers; and
a third optical connector coupled to the branch optical fiber.

12. The distribution unit of claim 10, further comprising an optical fiber branch including at least two branch optical fiber, wherein the distribution cable comprises twelve body optical fibers each having a position number 1 through 12, wherein the field-side optical fiber leg comprises twelve field-side optical fibers each having a position number 1 through 12, wherein the at least two branch optical fibers are spliced to the position 6 and the position 7 body optical fibers, respectively, wherein the position 1 body optical fiber is spliced to one of the field-side leg optical fibers at positions 2-6, wherein the position 12 body optical fiber is spliced to one of the field-side leg optical fibers at positions 7-11, wherein the position 1 and the position 12 field-side leg optical fibers are not spliced to any of the body optical fibers.

13. The distribution unit of claim 12, wherein the distribution cable includes at least twelve distribution optical fibers, the source-side optical fiber leg includes at least twelve source-side leg optical fibers and the field-side optical fiber leg includes at least eleven active field-side leg optical fibers and a single inactive field-side leg optical fiber.

14. A connectorized optical cable assembly for an optical fiber distribution system, the cable assembly comprising:

a distribution cable including at least six distribution cable optical fibers extending between a first end and a second end of the distribution cable;

a source-side tether comprising:
at least six source-side tether optical fibers; and
an optical connector coupled to a source end of each of the at least six source-side tether optical fibers;

a source-side splice location at which a field end each of the at least six source-side tether optical fibers is spliced to one of the at least six distribution cable optical fibers;

a midpoint branch tether including a branch tether optical fiber spliced at a mid-point location to one of the at least six distribution cable optical fibers;

a field-side tether comprising:
at least six field-side tether optical fibers; and
an optical connector coupled to a field end of each of the at least six field-side tether optical fibers; and a field-side splice location at which each of at least five of the field-side tether optical fibers are spliced to one of the distribution cable optical fibers and at least one of the field-side tether optical fibers is not spliced to any of the distribution cable optical fibers.

15. The cable assembly of claim 14, wherein a single field-side tether optical fiber is not optically coupled to a distribution cable optical fiber.

16. The cable assembly of claim 14, wherein the distribution cable comprises twelve distribution cable optical fibers, each having a position number 1 through 12, wherein the field-side tether comprises twelve field-side tether optical fibers, each having a position number 1 through 12, wherein the branch tether optical fiber is spliced to the position 1 distribution cable optical fiber, wherein the position 2 distribution cable optical fiber is spliced to the position 1 field-side tether optical fiber, wherein the position 12 field optical fiber is not spliced to any of the distribution cable optical fibers.

17. The cable assembly of claim 16, further comprising:
a second field-side tether comprising:
at least twelve, second field-side tether optical fibers, each having a position number 1 through 12; and
an optical connector coupled to a field end of each of the at least twelve second-side field tether optical fibers;

wherein the distribution cable comprises at least twelve additional distribution cable optical fibers, each having a position number 13 through 24;

wherein each of the second field-side optical fibers is spliced to one of the additional distribution cable optical fibers such that the second-side field tether optical fibers at position numbers 1-12 are each spliced sequentially to the additional distribution cable optical fibers at position numbers 13-24, respectively.

* * * * *

UNITED STATES PATENT AND TRADEMARK OFFICE
CERTIFICATE OF CORRECTION

PATENT NO. : 10,718,921 B2
APPLICATION NO. : 15/602347
DATED : July 21, 2020
INVENTOR(S) : Diego David Torres Page 1 of 1

It is certified that error appears in the above-identified patent and that said Letters Patent is hereby corrected as shown below:

In the Claims

In Column 11, Line 24, Claim 1, delete "either a" and insert -- a --, therefor.

Signed and Sealed this
Twenty-second Day of September, 2020

Andrei Iancu
*Director of the United States Patent and Trademark Office*